United States Patent Office

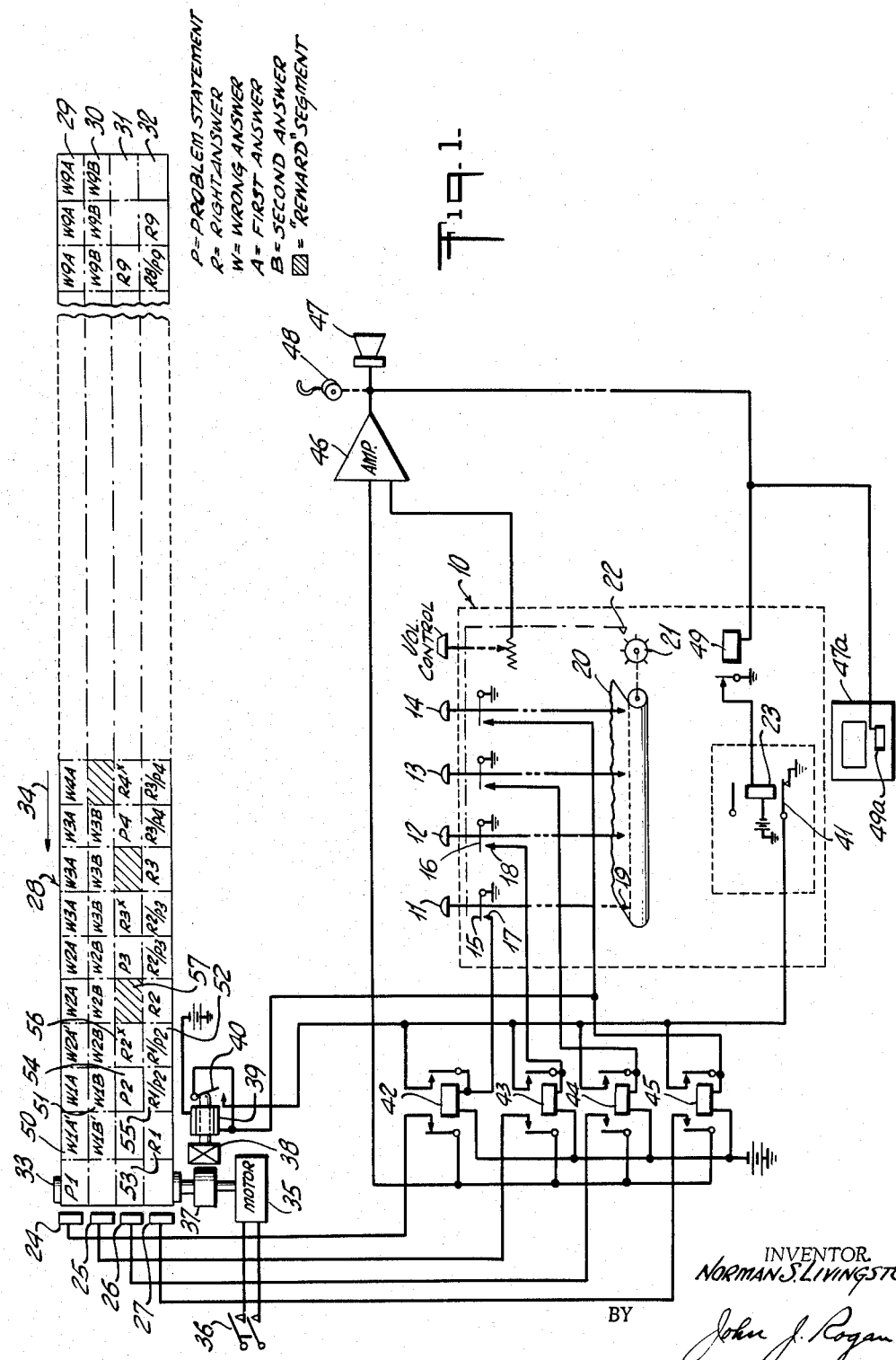

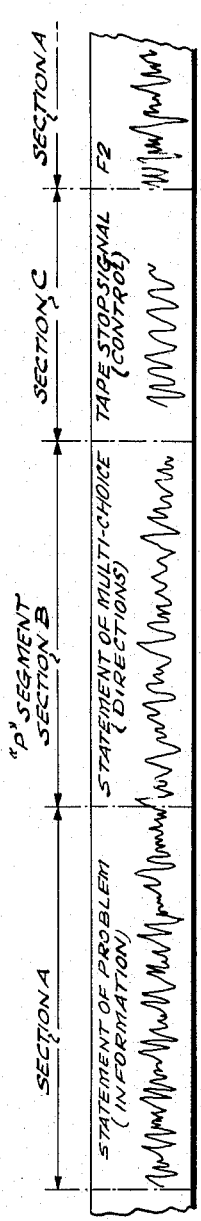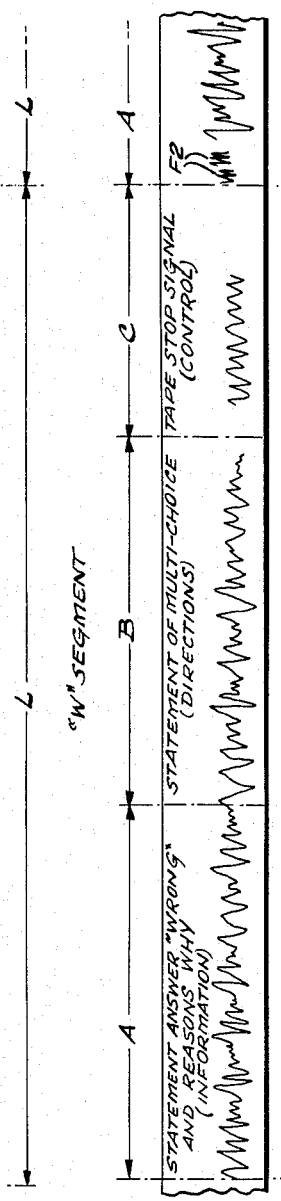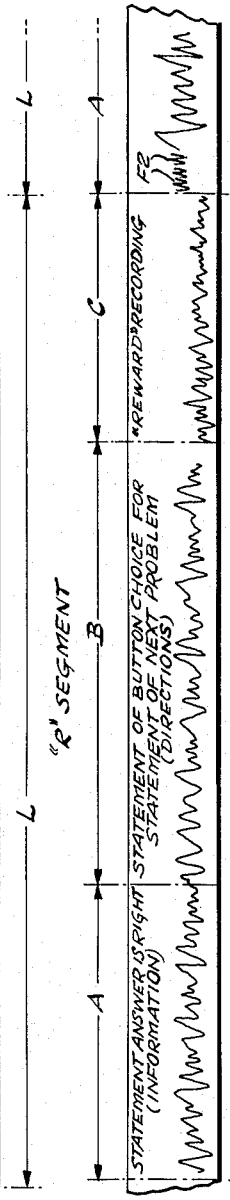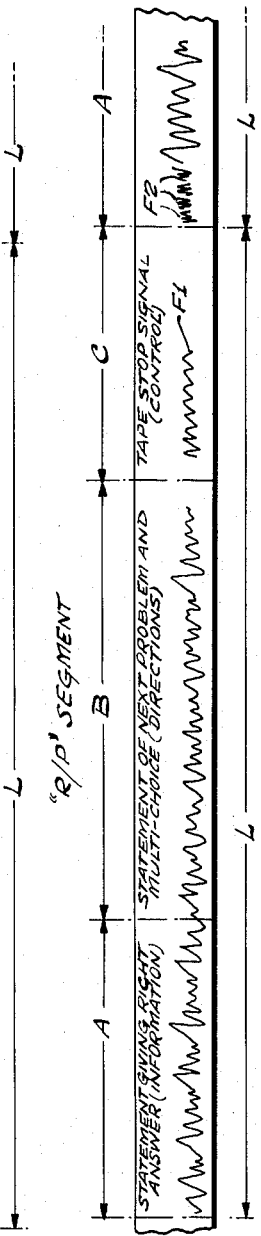

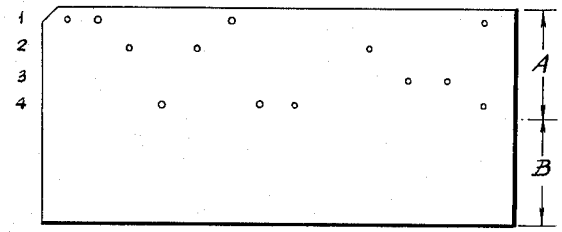
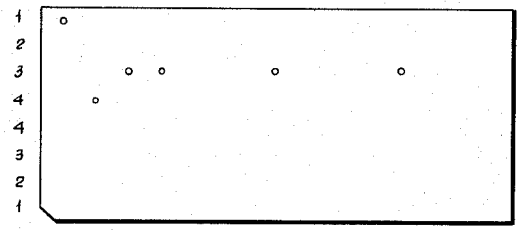
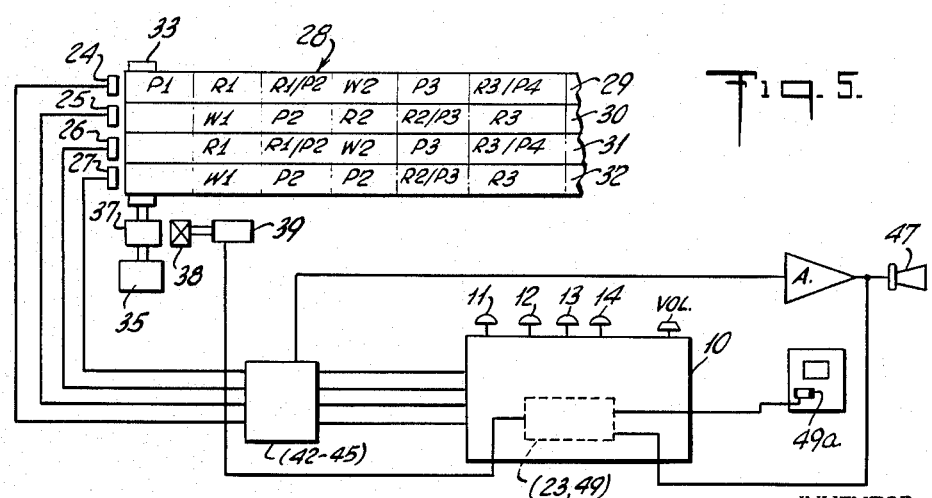

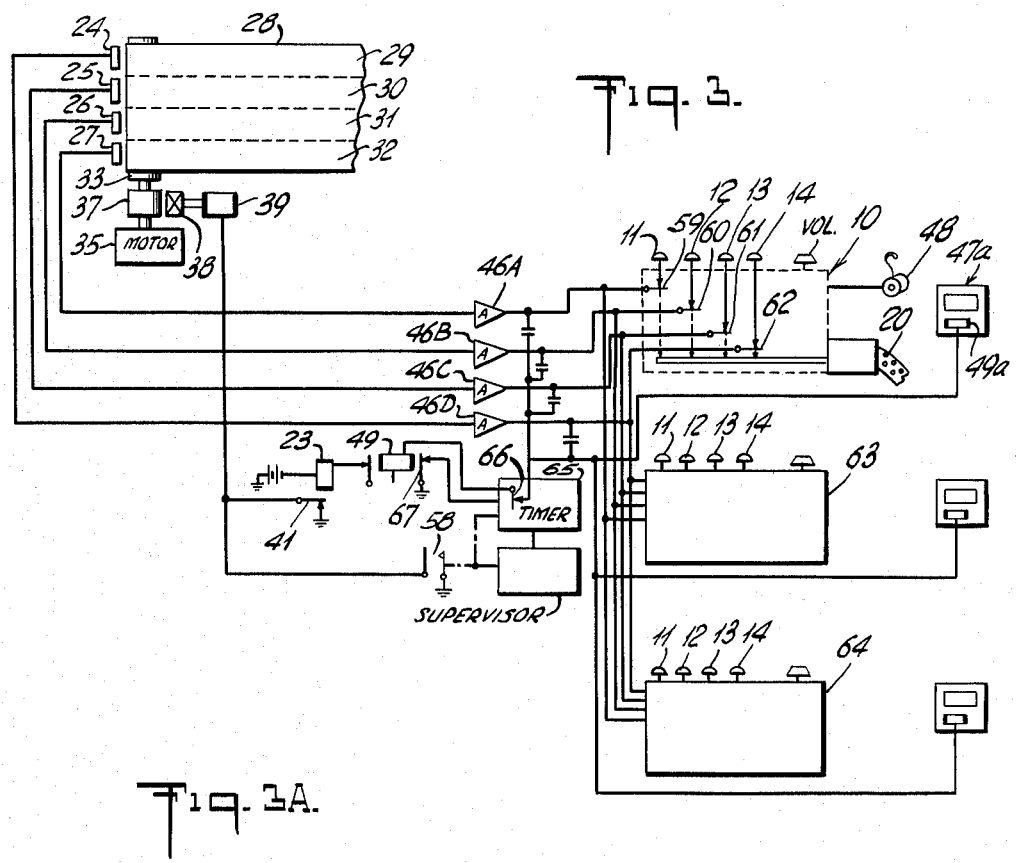

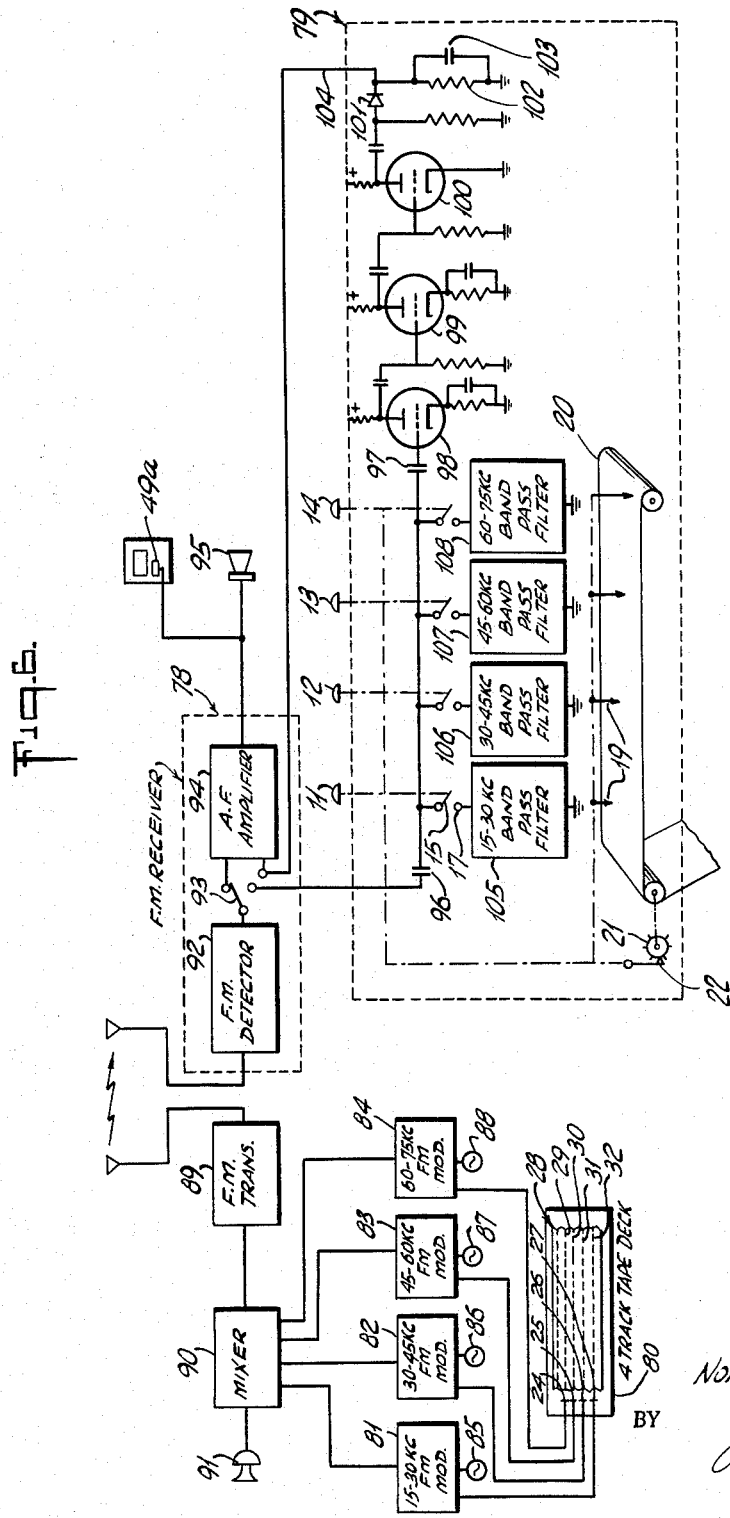

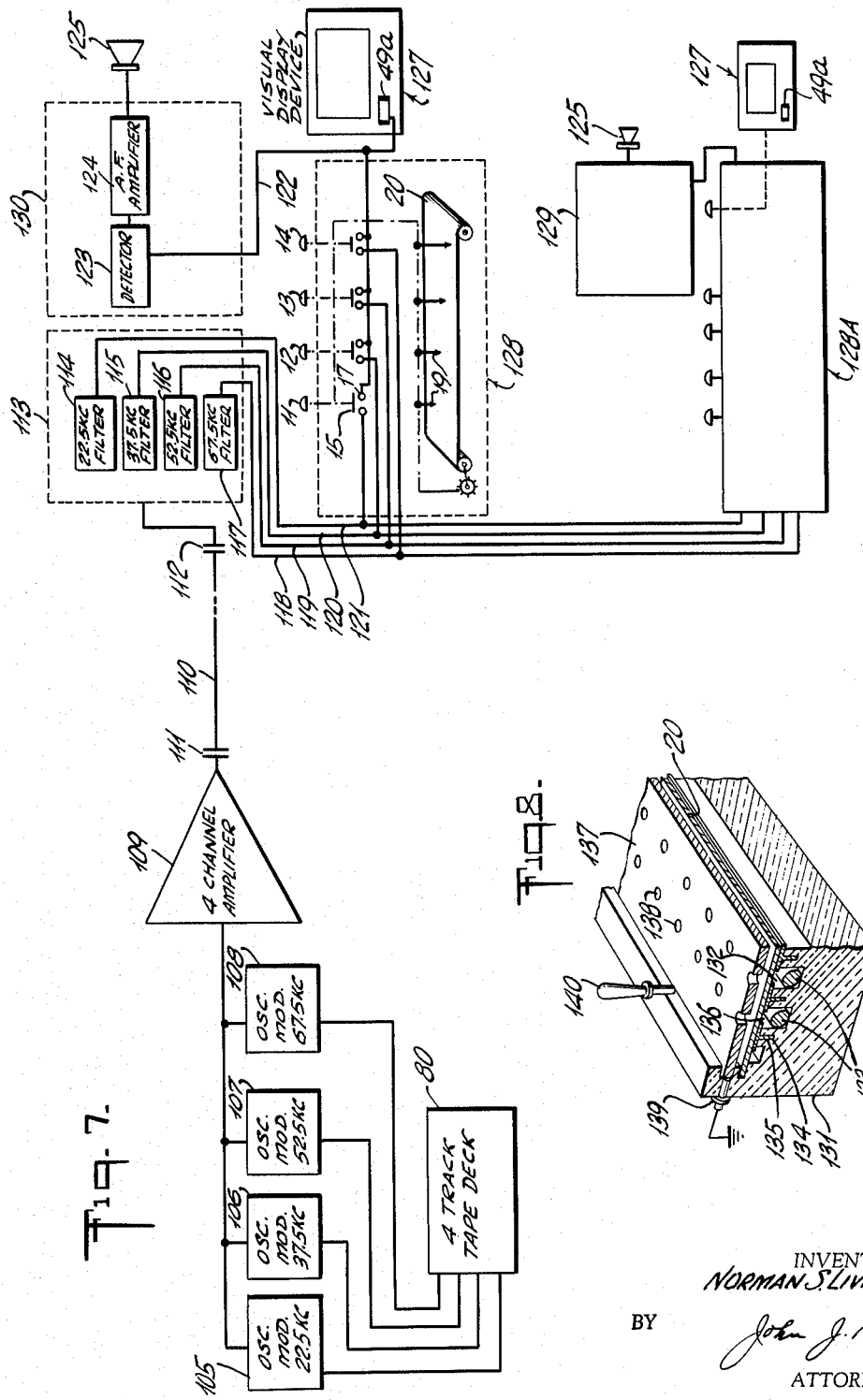

3,255,536
Patented June 14, 1966

3,255,536
SELECTIVE PROGRAMMED INFORMATION
RECEIVING AND RESPONDING SYSTEM
Norman S. Livingston, New York, N.Y., assignor to Tutortape Laboratories, Inc., New York, N.Y., a corporation of New York
Filed Dec. 12, 1963, Ser. No. 330,142
32 Claims. (Cl. 35—9)

This invention relates to informational dissemination systems and more particularly it relates to selectively retrievable informational systems. Typical of such systems are those used to achieve self-instruction or group instruction or guidance by means of specially programmed recorded data or information.

During recent years, the field of so-called machine-instruction and individual or group testing has received accelerated consideration. This has arisen for a variety of reasons, not the least of which is the scarcity of well trained teachers. This is especially true in highly specialized fields where the information to be conveyed must be accurate and authoritative, and where the lack of availability of highly trained teaching personnel is critical. In certain instructional fields the vocal personality of the teacher is of great importance and for that reason, amongst others, any system of machine-instruction which is not vocal in nature loses some of its effectiveness. In certain respects, therefore, a good tutoring machine can be operated to impart even better results than those obtained by the average good teacher in person. Thus where the instructional data or information is in the form of a continuous auditory record, such record can in the first instance, be prepared and recorded by experts. in some particular field of instruction. This permits the close cooperation of subject matter experts, as well as other experts such as psychologists, to insure that the subject matter is recorded in the most desirable, accurate, and incentive-generating form.

Accordingly, one of the principal objects of this invention is to provide a system and organization of apparatus capable of meeting the instructional and/or entertainment requirements of an individual or of a large segment of the population, in a wide variety of fields at low cost and while possessing advantages of a private personal tutor.

Another object is to provide a novel informational or data recording which is coded or keyed to a selective mechanism operable by a student or listener, whereby such student or listener can by so-called instructional feed-back acquire the correct information while at the same time automatically checking the correctness or incorrectness of his responses to questions, problems and the like carried in the said recording.

Another object is to provide a self-tutoring system or organization of apparatus employing a novel coded arrangement of informational units on a record tape or the like, wherein the operation of the system is to a certain extent correlated to the ability of the student to progress from one state of instruction to another more difficult and complex stage.

Another object is to provide a novel system and organization of apparatus for enabling existing radio broadcasting facilities to be used to carry tutorial and/or specialized entertainment programs to the public without interrupting or interfering with regularly scheduled broadcasts.

A further object is to provide a self-tutoring system and the like whereby the student or listener can receive coded programmed information to which responses can be made by the student or listener so as to give him a check on the accuracy of such responses, and simultaneously make a permanent record, for example, in the form of a punched card or tape of his score or test results in answering specific questions and solving one or more factually presented problems.

A further object is to provide a novel system or organization of apparatus for obtaining verifiable records of the response of listeners to transmitted programs, such as radio broadcasts, thus enabling more satisfactory and reliable information polls, entertainment response, program preference, etc., to be taken and accurately recorded.

A further object is to provide an improved machine-instruction system specially adapted to class or group instruction.

A further object is to provide a novel system and organization of apparatus for providing so-called machine-instruction over power lines or similar existing constructional facilities.

A further object is to provide a system of remote instruction or entertainment which is capable of providing both visual and aural information, and wherein the listener can check the accuracy of his responses so as to enable him to proceed from one stage to a succeeding stage or stages of instruction or entertainment.

A feature of the invention relates to the novel organization, arrangement, and relative location and interconnection of parts which cooperate to provide an improved self-tutoring or machine-instruction system.

Other features and advantages not specifically enumerated will be apparent after a consideration of the following detailed descriptions, the attached drawing and the appended claims.

In the drawing, which shows certain embodimtnts,

FIG. 1 is a complete schematic block and wiring diagram of a system embodying features of the invention especially adapted to private tutoring;

FIGS. 1a, 1b, 1c and 1d show in graphic form one typical array of segments recorded on plural-channel information storage means in accordance with the invention;

FIGS. 2a and 2b are schematic representations of perforated cards or tapes according to the invention;

FIG. 3 is a composite schematic block and wiring diagram of a system similar to that of FIG. 1 especially adapted to group or class instruction;

FIG. 3a is a modification of FIG. 3;

FIG. 4 represents a modification of the pre-recorded tape of FIGS. 1 and 3;

FIG. 5 shows a system similar to that of FIG. 1 but using a further modification of the pre-recorded tape;

FIG. 6 shows certain features of the invention embodied in a frequency modulated transmission system;

FIG. 7 represents a modification of the system of FIG. 6 adapted to power transmission.

FIG. 8 is a partial perspective and cross-sectional view of a modified selector device that may be used in any of the embodiments of the invention.

*General description of invention*

The invention contemplates the employment of specially pre-recorded magnetic tapes and the like which are recorded in equal length segments with various segments having different informational and directional records to be played back to a student. In other words, the tape is programmed in advance with the proper segments of recordings so that in each programmed tape and in each step the student is given a unit of material to hear and study. This material is followed by a multiple-choice question. The student's choice of answer determines directly and automatically what material he will hear and/or see next. If he chooses the right answer to the previous question, he is automatically presented with reinforcement or "reward" for this material and the next advance of unit material plus the next question. If he chooses an incorrect answer, he is automatically presented with material pre-recorded to correct the particular error he has just made. At the end of this correctional material, the student is directed to references of the original presentation and is further reinforced with the correct answer to the question. In other words, the student's progress proceeds with reinforced data when he chooses correct answers to questions and he is given specific remedial material should he make errors. One of the important features of this programmed instructional arrangement is the fact that the material presented to each student is continuously and directly controlled by the student's performance in answering questions. To permit this step-by-step control of the played back program by the student, the questions are placed in a multiple-choice format. The choice of an answer to a multiple-choice question can therefore be translated into a physical act such as pushing one of a series of selected buttons which brings the appropriate played back material for aural listening and/or viewing. The direct purpose served by the questions in the pre-programmed material is to determine whether the student has understood the material he has heard and/or viewed. By supplying the student with the next material he will hear and/or see, and recording his answer on punched tape cards or the like, supervisory teachers are able to review each individual student's progress and learning patterns.

To describe the invention, the system is illustrated using a 4-track audio-frequency recorded tape preferably in the form of readily replaceable cartridges which may be selected by the student or trainee. The playback of the programmed material is communicated to the student, in one form of the invention, at a rate which is under the student's control. The playback machine stops at the end of each question to give the student a chance to think over what has been said by the teacher in the recorded program segment and to view, if required, the content of a synchronized slide which has been illuminated to support and/or augment the aural information before selecting an answer, for example, by pressing one of four buttons to play back the reinforcement and/or remedial material.

In one form of the invention the system is especially adapted to private tutoring. In another form, the student has the benefit of programmed learning as part of a class of students, and the system is controlled from a central point or console which can be under the supervision of a teacher.

In addition to the invention being capable of use for individual or classroom tutoring, it is also possible to transmit the programmed learning format over existing frequency modulation and television broadcast stations without noticeably disturbing the normal broadcasting functions of these stations, thereby providing education to a great number of people on an economical basis and overcoming the difficulties of travelling to a learning center or purchasing more expensive tape playback equipment required in individual self-tutoring machines. In this last mentioned embodiment, all those in the transmission area of the frequency modulation or television transmitter can be equipped with a simple but somewhat modified frequency modulation receiver which can intercept the information in the form of a plurality of four sub-carriers which contain the broadcasted learning material. Each such frequency modulation receiver has connectable to it a selector arrangement either in the form of a plural push-button device, or in the form of a single manually insertable conductive rod or stylus which is arranged to be inserted in a chosen one of a series of guides so that the insertion in any guide causes a playback head circuit connection and simultaneously perforates a standard IBM matrix-controlling card or the like. This permits, on a machine-paced basis, the following in a step-by-step manner of the broadcast of multiple-choice questions and choosing answers in the programmed broadcast format. The card or push-button selection devices allow the student or listener to record the accuracy of his answers, which records can be transmitted to a supervisory center for scoring, so that the effectiveness of the student-teacher relationship for a specific course of information may be recorded for reference purposes. On a continuous basis broadcast type of system the programmed material may be broadcast by special frequency modulation sub-carrier transmitter with a minimal loss of power with respect to the use of the transmitter for entertainment or other conventional broadcast service.

*Detailed description*

Referring to FIG. 1 there is shown in schematic block diagram form a self-tutoring system embodying certain features of the invention. The block 10 represents a control box having a series of manually operable selector buttons 11, 12, 13, 14. These buttons are interlocked in the conventional way so that when one button is depressed it releases any previously operated button. Each button is mechanically connected to an associated set of movable switch contacts 15, 16, etc., which are normally spaced from respective stationary contacts 17, 18, etc. Likewise, each button is mechanically connected to a tape or card perforating punch or needle 19. These punches or needles are normally out of perforating contact with a movable card or tape 20 which is arranged to be moved or indexed in a step-by-step manner by means of any well known indexing mechanism represented schematically by the ratchet wheel 21 and the cooperating pawl 22. Pawl 22 is connected to the buttons 11–14 so that when any button is depressed it causes the tape 20 to be perforated for purposes to be described hereinbelow. The pawl 22 is mechanically interlinked with the buttons 11–14 as indicated by the dot-dash line so that on the return stroke of each button the tape or card 20 is indexed to the next card punching position.

Each of the buttons 11–14 is individual to a corresponding stationary playback head 24–27 forming part of a multi-track transducing system which also includes a multi-track record tape 28. Tape 28 is preferably, although not necessarily, of the magnetizable kind which has a series of tracks 29–32 individually scanned by a respective head 24–27. Tape 28 is moved past the heads by means of any well known tape transporting mechanism.

Preferably tape 28 may be of the so-called cartridge form so that it can be expeditiously loaded into the playback device. Merely for illustration, the tape 28 is shown at the beginning of its playback and is carried by a suitable receiving reel 33, the pay-off reel not being shown. It will be understood, of course, that the invention is not limited to any particular kind of tape transport winding and rewinding mechanism. As indicated, the tape is driven in the direction of the arrow 34 by a suitable motor 35 which can be supplied with electric power from any suitable source (not shown) and controlled by a power supply switch 36. Motor 35 drives the capstan 37 of the tape transport through any well known friction clutch 38 controlled by a solenoid 39. When solenoid 39 is deenergized the clutch is disengaged and the tape immediately stops. When the solenoid 39 is energized it causes the tape 28 to move at its required speed in the direction of the arrow 34.

The circuit for solenoid 39 is initially controlled by button 11, but thereafter it is controlled by any of the buttons 11–14 which can be momentarily operated so as to close a circuit through its respective contacts and thence through the winding of solenoid 39 to grounded return potential. Solenoid 39 immediately locks through its locking contacts 40 and thence to ground through the contacts 41 of relay 23. It should be noted that relay 23 remains deenergized until it receives an operating signal at the end of the scanned segments of the tape 28, as will be described hereinbelow. The momentary operation of any of the buttons 11–14 also closes an operating circuit through a respective one of the relays 42, 43, 44, 45. The particular relay operated immediately closes a locking circuit through its winding and through its right-hand locking contacts to ground at the contacts of relay 23. The particular relay that is operated in the group 42–46 connects the corresponding playback head of the group 24–27 to the common input of the amplifier 46 whose output is connected to a suitable reproducing loud speaker 47, and if desired, through a telephone earpiece 48.

Upon the energization of solenoid 39 as above described, the tape immediately begins to move and the appropriate one of the recorded tracks is scanned by the selected playback head which, of course, was determined by the particular button that was operated. The output of the amplifier 46 is therefore an audio-frequency signal and as long as this signal continues it maintains a relay 49 in operated condition, thus maintaining open the circuit of relay 23. On the other hand, when the audio-frequency output of amplifier 46 ceases it causes the de-energization of relay 49 and closes an operating circuit for relay 23. Instead of relying on such a "silence test," if desired at a suitable point in each segment, the tape may have recorded therein a special frequency F1 which when played back causes the operation of relay 49, which may be any well-known resonant or frequency responsive relay. It will be understood that this frequency F1 and other control frequencies to be described hereinbelow are outside the frequency band of the intelligence or voice recordings in the tape. Relay 23 at its contacts 41 breaks the locking circuit for the previously operated relay in the group 42–45 and also breaks the locking circuit for the solenoid 39 which immediately stops further motion of the tape 28. The tape remains stationary until one of the buttons 11–14 is reoperated, as will be described hereinbelow. During this stopping period, the student is given time to consider his answer to the previous problem which has been scanned by the selected playback head.

In order that the operation of the system may be more clearly understood, it will be necessary to explain in detail one typical manner in which the records on the various tracks of tape 28 are arranged and coded with relation to the buttons 11–14. As will be understood, only a portion of the complete length of the tape is shown in FIG. 1 and its width is greatly exaggerated. For simplicity of explanation, only four tracks are shown and each track may be considered as divided into a series of equal length segments, P1, W1A, W2A, etc. It will be understood that while the drawing shows the segments outlined in dot-dash lines, they are not separate and distinct physically since the tape carries the various items to be played back in the form of continuous magnetic recordings. In order that the functioning of the plural track tape can be understood, the various segments are labelled in accordance with the following code:

1. P1, P2, P3, etc. _____ Statement of problems 1, 2, 3, etc., to be answered.
2. {W1A, W2A, etc. ____ Statement as to why answer is wrong for respective problem and reasons why.
   W1B, W2B, etc.
3. R1, R2, R3, etc. _____ Statement that answer is correct and directions how to obtain statement of next problem.
4. R1/P2, R2/P3, etc. ___ Statement giving correct answer followed by statement of next problem.
5. "Reward" segment ____ Recordings of music, additional or other interesting information not necessarily related to the previously answered problem.

Where the system is to include a visual display device such as a film strip or the like it may be controlled by one or more successive pulses and these pulses can be recorded on the tape as a distinct frequency F2 different from the motor control frequency F1 and also outside the band of the intelligence or voice frequencies on the tape. This display control frequency can be recorded for example at the beginning of each of the above listed segments.

In accordance with the invention, the various equal length segments in the tracks are arranged and coded so as to be correlated functionally with the buttons 11–14. FIGS. 1a–1d show in more graphic form a typical array of such segments with their coded identification. In general, each segment may be considered as formed of three sections, A, B, C. Section A may be referred to as the information segment in that it carries recordings of, for example, the factual statements applying to any particular problem or situation as to which the student is to acquire information and is to be tested for his responses thereof. The section B of each segment may be considered a direction section, in that it gives directions to the student as to what choice of buttons he is given in answering the problem. For example, he may be given three choices but without informing him which is the correct button to press for the correct answer. The third section C may be considered the control section, and it occurs at the end portion of each segment, its duration being, for example, five seconds. During this control section, solenoid 39 is deenergized and the tape is stopped, giving the student time to study the factual situation or problem previously played back from the associated track section so that he can determine his answer.

In the P segments (FIG. 1a) the first section of each such segment contains the problem or factual statement and a statement as to the button choices the student has to ascertain the correct answer. However, in a W segment (FIG. 1b) the section A thereof may contain a recording that the student's answer, as represented by the button which he has previously pressed, is wrong and giving him the reasons why the answer selection is wrong. The B and C sections of a W segment can be the same as the corresponding sections of a P segment.

The first or A section of an R segment (FIG. 1c) may contain the statement that the student's answer choice is correct and may also include any additional information with respect to the problem that has been correctly answered. The B section of an R segment contains directions as to which button is next to be operated to receive a statement of the next problem. The C section of an R segment can be the same as the C section of the P and W segments.

The first or section A of an R/P segment may contain a statement giving the correct answer followed by a statement of the next problem. The B section of this segment will contain a detailed statement of the next problem P2 as well as directions as to what choice of buttons is given for the correct answer to this next problem. As is apparent from FIG. 1, the student has a choice of three buttons, namely buttons 11, 12 and 14.

Merely for illustration and explanation, let it be assumed that the student is being tutored in the principles of the law of contracts. The student, after closing the power supply switch 36 to start motor 37 and also the power for the display device 47a, operates button 11. This starts the tape 28 and connects the head 24 to the amplifier 46. As stated hereinabove, the tape may have recorded just ahead of each A section of the segment a special frequency F2 for controlling the stopping of any well known visual display device 47a. This device may include a film strip and film indexing mechanism with the frames in the strip bearing pictures or images correlated with the particular problem being played back from the tape. The number of steps through which the strip is indexed will be determined by the number of spaced groups of frequency F2 recorded on the tape. The segment P1 is scanned and plays back from its section A (FIG. 1a) for example, the fundamental principles of a valid contract such as "Offer and Acceptance." This section A also plays back a given factual situation relating to a valid contract; then section B is scanned and plays back to the student that he has a choice of two-out-of-three button selections, namely buttons 11, 12 and 14, two of which will represent wrong answers and the third of which will represent a correct answer. Of course the playback from section B of problem segment P1, for example, will inform the student that if he believes the contract is valid, to push button 14 and if he believes it to be invalid to push either button 11 or button 12. Section C is then scanned to cause the operation of relay 23 and the stopping of the tape. During this period the student has time to consider the problem P1, and the tape remains stationary until the student presses a button. Let it be assumed that the student decides the contract is invalid for one of two reasons and he operates button 11. This operation again connects head 24 to amplifier 46 and causes segment 50 to be scanned. The first section of this segment contains a recording that the answer is wrong and gives the reasons why. In section B of this segment the student is instructed that he has now left a choice of two buttons, namely buttons 12 or 14. The tape then stops and if the student operates button 12 the next segment 51 is scanned representing a wrong answer and the reason given why the answer is wrong. In section B of this segment 51 the student is instructed to operate button 14 for the correct answer and for a statement of the next problem. When he presses button 14 the segment 52 is scanned telling the student what the correct answer is and stating the next problem.

If in response to the first problem P1 the student had decided on the correct answer represented by button 14, then segment 53 is scanned telling the student that his answer is correct and directing him to operate button 13 to receive the statement of the next problem P2 resulting from the scanning of segment 54.

If in response to the first problem P1 the student had operated button 11, segment 50 would have been scanned telling the student that his answer is incorrect and giving him a choice of buttons 12 or 14. If he now chooses button 12, segment 51 is scanned, thus telling the student that his answer is incorrect and instructing him to operate button 14. When he operates button 14 segment 52 is scanned giving him the details of the correct answer to problem P1 and then a statement of problem P2 and directing him to choose button 11, 12 or 14 for the correct answer to problem P2. If in response to the first problem P1 the student had first operated button 11 and then had operated button 14, segment 55 would have been scanned, and here again, the student would be told the details of the correct answer to problem P1 and then would be given a statement of problem P2 with directions to operate buttons 11, 12 or 13 for the correct answer to problem P2.

If in response to problem P2 the student selects button 13, segment 56 is scanned telling the student that his answer is correct. Since the answer is correct it is not necessary to stop the tape driving motor at the end of the scanning of segment 56 so that the tape may continue to scan segment 56 and the next subsequent "reward" segment 57. This reward segment need not contain any problem statements or directions but it may contain any pleasing recording, such as complimenting the student on his correctness or even playing back music or other suitable material which may be considered pleasing to the student. Near the end of segment 57 there is a recording telling the student to operate button 13, for example, for a statement of the next problem P3. It will be understood that near the end of the segment 57 the motor stopping action takes place as hereinabove described awaiting the operation of button 13 to restart the tape movement to receive the playback of problem P3.

From the foregoing it will be seen that the student, in connection with each played back problem, is given a choice of three possible button selections, two of which represent wrong answers to the problem and the third of which represents the correct answer. If the correct answer is selected on the first button operation, only one such button operation is required for each problem and is recorded on the card 20. If only one incorrect answer is given, two button operations are required and correspondingly recorded on card 20; if two wrong answers are given, three button operations are required and recorded on card 20.

The foregoing sequence of operations will continue throughout the length of the tape 28 and at the end of the tape a suitable recording may be played back to the student any desired statement or statements such as "stop motor and remove tape cartridge."

The system described in connection with FIG. 1 is particularly adapted to so-called private tutoring wherein the student has control over the speed at which the information is communicated since the tap is positively stopped at the end of each scanned segment and the time given for answering by button selection is entirely controlled by the student. It may be desired, however, to use the tape 28 of FIG. 1 and its associated controls for classroom or group tutoring wherein the rate of communication of the information is under the control of a teacher or supervisor. Thus, the supervisor may control the time interval allowed for answering, and that interval may be determined by a previous evaluation of the student's ability, or even from an evaluation of previous scorecard recordings, as explained in connection with FIG. 2a and FIG. 2b.

FIG. 2a shows a typical card which has been perforated by a student who has answered incorrectly once or twice for each of the problems, whereas FIG. 2b shows a typical card which has been perforated by a student who has made all the correct answers on the first choice. These cards may be of any well known kind such as the well known IBM cards that are used in card-controlled computers and the like. For example, each card may have ten linear rows to receive perforations, but since only four perforations are required for a 4-track tape, as above described, one-half of the card, for example, portion A, may be used for recording of answers to one complete tape and the other half of the card, represented by portion B, may be used for another complete tape. This would require reversal of the card in the perforating mechanism corresponding to the tape that is being used. With the particular arrangement of recorded segments given as an example in tape 28 of FIG. 1, all the right answers on the first choice will appear as seen in FIGURE 2b. Thus, by an examination of the perforated card, it is possible to determine the score of a student with respect to his answers to the various problems, since there will be a linear array of perforations after the first two, showing that no erroneous answers have been made.

A typical system of classroom tutoring is schematically shown in FIG. 3 wherein the parts or elements which function the same as those of FIG. 1 bear the same designation numerals. Thus the tape 28 has the various segments pre-recorded with appropriate information therein as hereinabove described. However, instead of relying on the student pressing a button to restart the movement of the tape between successive segments, the restarting is under control of a supervisor. As in the system of FIG. 1, the tape is automatically stopped at the end of section C of each scanned segment, including the R segments, and is restarted under control of a supervisor controlled switch 58 to energize solenoid 39 which immediately locks under control of relay 23 as hereinabove described.

In FIG. 3 the playback heads 24–27 are connected each to a separate one of a 4-channel amplifier 46A–46D. the outputs of these amplifiers are connected to the contact sets 59, 60, 61, 62, each contact set being normally open and arranged to be closed by the respective student's button 11–14. Thus, when any button is operated it connects the student's telephone earpiece 48 to the selected channel amplifier. The volume control knob adjusts the volume of sound from the earpiece 48. As indicated, the blocks 63, 64, etc., represent a number of student control units similar to unit 10 and all having their buttons 11–14 connected to the respective amplifiers 46A–46D. However, in FIG. 3 the operation of the tape starting and stopping solenoid 39 is under control of the switch 58 which can be momentarily controlled by a supervisor to start the tape transport. When the class instruction is to begin, the supervisor manually closes contacts 58 and solenoid 39 immediately locks. Relay 23 as hereinabove described is under control of relay 49 which remains in operated condition until the special motor stop recorded signal is scanned. When this occurs, relay 49 operates and releases solenoid 39. The reoperation of solenoid 39 may be under control of a timer 65 of any well known kind having a normally closed contact set 66 through which relay 49 is controlled. When relay 49 releases at the end of section C of any scanned segment, it starts the timer 65 in operation and after a timed period preset by the supervisor, the timer motor (not shown) is closed to contacts 67. When the timer has completed its timing cycle, it again closes contacts 66 to operate relay 49 and to release relay 23. The timer also momentarily closes the contacts 58 to restart the tape. It will be understood that instead of automatically starting and stopping the tape at the end of each segment, once the tape is started for playback, it may remain in continuous motion until the complete tape has been played back. Such an arrangement is schematically shown in FIG. 3a. In that figure, the tape 28 is prerecorded with the various segments as illustrated, for example, in FIG. 1. However, the tape transport is controlled by a switch 39A which can be operated by the teacher or supervisor. Each segment may have a predetermined unrecorded section at its end, for example, of five or ten seconds duration during which no playback is heard, thus giving each student time to consider his answer and his corresponding button selection with respect to each problem. Here again, each of the student's units 10 is provided with a recording card or web 20 which is perforated by the student at the time he operates each of the buttons. Likewise each student's unit may be provided with an associated visual display device 47a whose indexing control device 49a is operated under control of the special frequency F2 that may be recorded in the tape at the beginning or end of each tape segment.

Merely for simplicity in explanation, the particular pre-programming of the tape 28 illustrated in FIG. 1 shows all the correct answers associated with head 26 and track 31. In other words, after the first problem, track 31 has all the remaining problems and the confirming right answers arranged in sequence on that same track. It will be clear that the recordings in each vertical row of four segments across the width of the tape can be scrambled in any predetermined fashion so that any particular track throughout its length will not have the same class of segments so far as playback is concerned. One typical arbitrary array of the segments is illustrated in FIG. 4. By this arbitrary arrangement, the student is unable to determine by repeated usage of the tape the location of the correct answer segments.

Under certain circumstances, it may be desirable to pre-record the tape with questions or problems that require merely "yes" or "no" answers so that the student is required at each problem to choose only one-out-of-two buttons. For this purpose, the various segments for the right and wrong answers may be recorded in duplicate on the 4-track tape 28 as shown in FIG. 5. For example, after playing black problem P1, the student is informed by the scanning of segment P1 that if his answer is "yes" he can operate either button 11 or button 13 and if his answer is "no" he can operate either button 12 or button 14. It the "yes" answer is the correct answer and he operates button 12, the W1 segment will play back to him a statement that his answer is wrong and he is instructed to reoperate either button 11 or button 13 which causes the R1/P2 segment to give him the correct answer and to indicate his choice of buttons for the answers to problem 2. The operation of the system of FIG. 5 is otherwise the same as the operation of the system of FIG. 1.

If desired, one length of the tape can be recorded with one-out-of-two choice segments as in FIG. 5 and another length can be recorded with two-out-of-three choice of segments as in FIG. 1.

Referring to FIG. 6 a description will now be given of the invention wherein a pre-recorded plural track tape 28 is used to control a frequency modulation or television transmitter so that the information can be broadcast to a large audience. The elements in FIG. 6 which are the same in function as those of the preceding figures bear the same designation numerals. Each listener is provided with a frequency modulation receiver 78 of any known design, in conjunction with a plural-button selector unit 79 whereby each listener can receive the various items of broadcast information such, for example, as the problems P1, P2, etc., and decide what is the correct answer by operating one of the four buttons 11–14. In FIG. 6 the source of the plural track information may be a 4-track tape playback deck 80 which is located at a broadcasting studio, and it includes the tape 28 which may be pre-recorded with segments such as described in connection with FIGS. 1, 4 and 5. The tape is driven by any well known tape transport means and the starting and stopping thereof at the beginning and end of the transmission may be controlled by a time switch of any well known kind (not shown). The four tracks on the tape have associated therewith the respective playback heads 24–27.

Each of the playback heads 24–27 is connected to a respective FM modulator 81, 82, 83, 84 of any known design. Associated with each modulator is an oscillator 85, 86, 87, 88 for generating a base or center frequency which can be frequency modulated or shifted in accordance with the audio-frequency signals from the respective playback heads. The modulator 81 is designed to produce frequency modulations, for example, in the range between 15 kc. and 30 kc. The modulator 82 produces a frequency range of 30 kc.–45 kc.; modulator 83 produces a frequency range of 45 kc.–60 kc.; and modulator 84 produces a range of 60 kc.–75 kc. These frequency modulated outputs are then used as sub-carriers to modulate the main FM radio or television carrier which forms part of any well known FM or television transmitter 89. The modulated sub-carriers are fed to the transmitter 89 through any well known mixer 90 which can also be supplied with audio frequency signals in the range of 0–15 kc. arising from a sound source such as microphone 91. Preferably the modulation index of the four sub-carriers is kept at such a level that all side band energy is confined to the first harmonic of the modulated program material from heads 24–27.

The result is that there are broadcast from the transmitter 89 a main radio frequency carrier which is multiplexed in five different channels. The broadcast signals can be picked up by any well known FM receiver 78 whose detector stage 92 is connected through a two-position switch 93. In one position of that switch the signals from source 91 are connected to the audio-frequency amplifier 94 of the receiver and thence to the sound reproducer 95, thus enabling the listener to receive the standard broadcasts from the transmitter representing signals from source 91. In its other position, switch 93 connects the detector 92 through capacitors 96 and 97 to the input stage of another FM detector system comprising, for example, the grid-controlled electron tubes 98, 99, 100 and a diode 101. These elements are arranged to constitute in the well known manner the so-called "counter type" FM detector whereby the sinusoidal input waves applied through switch 93 are limited and clipped to convert them into square-shaped waves at the output of 100. Each of these square waves is differentiated to produce a pulse and by means of the diode 101 and the associated R–C integrating network 102, 103, only the positive spikes of the square waves are passed and integrated to form a voltage wave-form which closely resembles the audio-frequency envelope of the respective signals from heads 24–27.

In order that only one of the four detected sub-carriers alone can produce the output on conductor 104, each of the selector buttons 11–14 is connected through its associated normally open switch contacts 15, 17, to a respective band pass filter 105–108. Filter 105 passes only the band 15 kc.–30 kc.; filter 106 passes only the band 30 kc.–45 kc.; filter 107 passes only the band 45 kc.–60 kc. and filter 108 passes only the band 60 kc.–75 kc. These filters can be designed so that when one of the buttons 11–14 is operated is produces, for example, a 10 decibel rise level between the particular sub-carrier frequency that has been selected and the remaining sub-carrier frequencies. Since it is a well known characteristic of a frequency modulated detector to respond only to the strongest input, the selection of one particular sub-carrier practically eliminates the existence of cross-talk between the selected sub-carrier output and the remaining sub-carriers.

Since the buttons 11–14 correspond to the buttons 11–14 of FIG. 1, the operation of any button will cause the playback through reproducer 95 of the various segments in the selected track of the tape 28. Thus the listener is enabled to select any track by the selective operation of one of the said buttons. At the same time, the operation of each button causes the recording card or web 20 to be perforated by the associated point 19 as hereinabove described. Since the listener has no control over the starting and stopping of the tape, he is advised in advance in any suitable way to tune in his receiver 78 at a given time and he tunes it to the particular broadcast station on which the multiplex information is being broadcast. At the same time, he operates switch 93 to connect the unit 79 into circuit with amplifier 94 and sound reproducer 95. As soon as the transmission begins, the tape 28 at the transmitter scans the first or section A of the first problem segment P1 as hereinabove described and the student hears in the reproducer 95 a factual statement of that problem. The section B of this same segment is then scanned to give the student the choice of buttons to be operated as hereinabove described. After section B, the tape in that segment is blank for a period of five to ten seconds during which time the student considers his answer and makes his choice of button operation. At the same time he operates the chosen button, he perforates the card or web 20 to identify and record his answer.

At the end of the transmission or scanning of the complete length of the tape, the student is advised by suitable playback at the end of the tape that the instruction is completed and he may be given at this time any additional instructions, for example, the removal of the record card or web; the time of the next broadcast; the subject matter of the next broadcast, etc.

Referring to FIG. 7 there is shown a modification of the system of FIG. 6 wherein the transmission is effected over existing power lines or similar constructional media.

The parts of FIG. 7 which are the same as those of FIG. 1 and FIG. 6 bear the same designation numerals. Thus the 4-track tape is scanned by the four heads of a 4-track tape deck 80 in the manner described in connection with FIGS. 1 and 6. The individual playback heads are connected respectively to carrier frequency oscillator-modulator units 105, 106, 107, 108. Merely by way of example, unit 105 may produce an audio-frequency modulated carrier of 22.5 kc. corresponding to the playback of the first tape track. Unit 106 may produce an audio-frequency modulated carrier of 37.5 kc. corresponding to the second track. Unit 107 may produce a modulated carrier of 52.5 kc. corresponding to the third track, and unit 108 may produce a modulated carrier of 67.5 kc. corresponding to the fourth track. These modulated carrier channels are then fed to a four-channel amplifier 109 of any known kind, the output of which is applied to a power line 110 through a carrier frequency isolation capacitor 111. At the receiving end of line 110 a similar carrier frequency isolating capacitor 112 is connected. The capacitors 111 and 112 permit the said carrier frequencies to pass along the line but without other line frequencies being passed either to the transmitting end or to the receiving end of the line for signalling purposes.

Connected to the receiving end of the line 110 is a unit 113 comprising a series of four filters 114, 115, 116, 117 whose outputs are connected to the respective conductors 118, 119, 120, 121. These conductors are connected to the contact sets 15, 17, associated with the respective switch buttons 11–14. Thus when any button is operated it connects a corresponding modulated carrier over conductor 122 to a suitable carrier demodulator or detector 123 whose output is applied to an audio-frequency amplifier 124 and thence to the sound reproducing unit 125. The unit 128 which carries the buttons 11–14 and the button 126 may be similar to the corresponding unit 10 of FIG. 1 and will also include a moving tape or card 20 for recording the operations of the buttons 11–14 as described in connection with FIG. 1. The system of FIG. 7 is of course capable of multi-unit operation in which event the conductors 118–121 can be connected in parallel to additional units 128A similar to unit 128 and associated with each such unit is a detector-amplifier unit 129 corresponding to the unit 130. The operation of the system of FIG. 7 is otherwise the same as described in connection with FIG. 6.

While the selector units 10 in all the described embodiments employ a set of selector buttons, each allotted to a respective track on the master tape 28, the track selection may be achieved by a device such as shown in FIG. 8. This device may comprise a rectangular frame 131 of plastic or other insulating materials having in its base a series of parallel recesses or channels 132 in which lie or are anchored respective contact wires 133. The sides of each channel are also provided with shallow recesses 134 into which are fitted T-shape insulator members 135. These members are of such a width that their adjacent edges are spaced apart to define an elongated gap 136 which gap is in vertical alignment with a corresponding wire 133. The side walls of the frame 131 have guide notches into which may be inserted the recording card 20. The inner walls of frame 131 are also provided with additional guiding recesses to receive a perforated metal plate 137. Plate 137 has a series of parallel rows of perforations 138, the perforations in each row being in vertical alignment with the corresponding gaps 136. The plate 137 can be provided with a suitable connector lug 139 so that when the plate 137 is inserted into its guides, it makes electrical contact with the lug 139.

From the foregoing it will be seen that all the perforations 138 in any given linear row are in vertical alignment with the corresponding gaps 136 and the corresponding contact wires 133. Therefore when a suitable metal rod or stylus 140 is inserted into any given perforation 138 it electrically connects the corresponding wire 133 to the metal plate 137. Functionally, therefore, this electrical connection corresponds to the circuit closure between the switch contacts 15, 17 and 16, 18, etc., of the buttons 11–14 referred to in the preceding figures. The tip of stylus 140 may be in the form of a needle or card-punching point so that when the said stylus is inserted into any perforation it pierces the card 20 and at the same time it completes the switching contact for selecting the corresponding track of the tape. In the case of a 4-track tape, there will be four sets of perforations 138, and corresponding gaps 136 and wires 133 so that the student can choose any one of the rows of perforations for his answer. Each lateral array of perforations in the plate 137 can be numbered, this number being correlated with the problems and various segments in the recorded tape. With this arrangement it is not necessary to reverse the card and each half of the card can be used for recording previous reversal.

While the previous embodiments have been described primarily as tutorial arrangements wherein the tape contains problems or the like to be answered, it will be understood that other types of information may be recorded in the various segments. Thus, instead of problems the so-called P segments can contain a series of questions to be propounded to a student or listener and the recording contains instructions such that if his answer is of one kind, he operates a given selector button, if of another kind, he operates a second button, and so on for the various questions to be asked. Such an arrangement is particularly well suited to so-called watching or listener response, statistical study of radio-broadcast programs and the like. Thus, in the embodiment of FIG. 6 which relates to a frequency modulated broadcast system, tape 28 may have the segments corresponding to the problem segments of FIG. 1 pre-recorded with a statement or description of a given radio-broadcast program and may include a series of questions with respect thereto such as time of day when listening occurred, number of listeners at any given time, reaction to program, etc. Each such segment will include a recording as to which button to operate (or which position to insert the stylus of FIG. 8) depending upon which answer is intended by the listener. Thus each listener's choice is recorded permanently on the card 20 which after completion of the scheduled series of broadcasts can be removed and sent to any evaluating center for which the rating of any given program can be accurately determined. In fact, if the cards 20 are of the so-called IBM kind, they can be used in any well known card-controlled computer to read out the final result. With such an arrangement, the entity responsible for the rating analysis may provide a selected group of listeners with an FM receiver like that of FIG. 6 which receiver can be used to receive standard broadcasts when the rating operation is not being conducted.

The invention is not limited to the particular components and values hereinbefore mentioned as will be apparent to those familiar with the art. Likewise, while the invention has been explained in connection with a 4-track playback system, it will be understood that features of the invention can be employed using a greater or less number of tracks and playbacks heads and with appropriate recordings in the various segments in each track. Other changes and modifications may be made in the disclosed embodiments without departing from the purposes of the invention.

What is claimed is:

1. In a system for the selective receipt and response to transmitted information the combination, of plural channel information storage means, means for sensing and for reproducing information in transmission-time segments in said plurality of channels, means for moving said information storage means with respect to said sensing means, certain of said channels including first segments containing factual statements and including problems to be responded to by a listener, other segments in certain channels containing information of respectively different categories related to the corresponding first segments, said first segments and said other segments being so related on said information storage means that a first segment is first presented to said sensing means and at a later time said other segments related thereto are simultaneously presented to said sensing means, selector means for selecting one of several of said other segments, said other segments concurrently presenting information which confirms the correctness or incorrectness of the selection, signal reproducer, and means responsive to the operation of said selector means to transmit to said reproducer and to said listener the information confirming the correctness or incorrectness of the selection.

2. A system according to claim 1 in which said information storage means comprises a plural-track recording tape, said sensing means comprises a playback head for each track, and the said means to transmit to the listener the information contained in said selected segment comprises an amplifier common to all said heads, and means controlled by said selector means for selectively connecting said amplifier to one of said heads.

3. A system according to claim 1 in which said selector means includes a plurality of manually operable switches one for each of said channels, and means responsive to the selective operation of any switch to connect such channel to said reproducer.

4. A system according to claim 1 in which said selector means includes a device having a plurality of contact elements each allotted to one of said tracks, another contact element in common to said plurality of elements, and a manually operable device for selectively connecting said other contact element to any desired one of said plurality of contact elements.

5. A system according to claim 1 in which said information storage means comprises a plural-track recording tape, and said segments are all of equal transmission-time length.

6. A system according to claim 1 in which said information storage means comprises a movable plural track recording tape and said sensing means comprises a playback head for each track, and in which means are provided for automatically stopping the movement of the tape at the end of each segment that is scanned by a selected one of said heads.

7. A system according to claim 1 wherein said first segments further contain control signals, said system further including a visual display device having a display control element, and means responsive to the sensing of said control signals by said sensing means for automatically operating said display device to produce a visual display correlated with the recorded information in said first segments.

8. A system according to claim 1 in which a plurality of receiving stations are provided each including a signal reproducer and selector means, and a source of signals including a multiplex channel transmitter and a plural track recorded tape, each track controlling a respective multiplex channel, and means responsive to the selective manual operation of said selector means to connect the reproducer at any receiving station to a corresponding multiplex channel.

9. A system according to claim 8 in which said multiplex channel transmitter includes a frequency modulation radio transmitter and a plurality of sub-carrier modulators, and means for modulating each sub-carrier in accordance with information on a corresponding one of said tracks.

10. In a system for receiving and responding to transmitted information, the combination of a plural track magnetic recording tape, respective means for scanning each track, an amplifier common to said tracks, motor means for producing relative unidirectional scanning motion between said tape and scanning means during playback, each track containing successive segments to be scanned, one category of said segments containing one class of information such as the statement of a problem, said one category further containing directions to be transmitted to a listener as to which choice of switch means the listener is to operate, one of said choice of switch means being indicative of a correct response to said problem and another of said choice of switch means being indicative of an incorrect response to said problem, means to start said scanning motion, means for automatically stopping said motion at the end of each scanned segment containing a problem, and manually operable selector means to connect said amplifier to any one of said scanning means, said manually operable selector means including a series of switches one for each track.

11. A system according to claim 10 in which said manually operable means includes a series of track selector buttons, means responsive to the operation of one of said buttons to start the initial scanning motion, and means responsive to the subsequent operation of any of said buttons to restart said scanning motion.

12. A system according to claim 9 in which each track includes a second category of segments each containing qualifying information with respect to said problem and also containing directions for the further choice of switch means the listener is to operate to obtain further information.

13. In a system for enabling a listener to receive and respond to certain transmitted information, information playback means comprising a plural-track magnetic tape, respective means for scanning each track, a plurality of manually operable members to select any track for playback, each track having equal length segments, each segment including a first section containing factual statements such as the statement of a problem, a second section including directions as to choice of said members to be operated by a listener to select a response to said problem, selection of one of said members being indicative of a correct response to said problem and selection of another of said members being indicative of an incorrect response to said problem, a third section to control the stopping of the playback at the end of each segment, motor means for transporting said tape to unidirectionally scan said segments for playback, and means for causing said motor means to restart the playback at the end of each segment.

14. A system according to claim 13 in which motor control means is provided which is responsive to the scanning of the control section of each scanned segment to stop the said playback at the end of each segment.

15. A system according to claim 14 in which said motor control means includes an element which responds to the absence of any recording in the motor control section of each scanned segment.

16. A system according to claim 14 in which said motor control means includes an element which responds to a distinctive signal recorded in the control section of each scanned segment.

17. In a system for receiving and responding to transmitted information, the combination of a master tape having a plurality of tracks with each track having a series of segments containing distinctive recordings, playback heads one for each track, motor means for producing relative motion between said tape and said heads, a sound reproducer, a plurality of selector means to associate any one of said heads with said reproducer, certain of said tracks including first segments containing playback information to be responded to by a listener, other segments on certain of said tracks containing playback information for indicating to a listener a choice of one out of said plurality of selector means for operation, said first segments and said other segments being so disposed on said tape that a first segment is first presented to its associated head and at a later time said other segments related thereto are simultaneously presented to said heads, and means confirming whether said choice is correct or incorrect, the last-mentioned means including one of said other segments and the head associated with its respective track which other segment contains said confirming information.

18. A system according to claim 17 in which said selector means includes manually operable switch means for selectively connecting one of said heads to said reproducer, a recording web, and means responsive to the operation of any of said switch means for making a permanent record of the successive selective operation thereof.

19. A system according to claim 17 in which said recording web is provided with a series of web marking means each controlled by a corresponding one of said switch means to mark said web in response to the operation of the associated switch.

20. A system according to claim 17 in which said heads are provided with an amplifier connected in common thereto, and means for transmitting said playback information recordings from all said tracks to said amplifier over a multiplex transmission channel.

21. A system according to claim 17 in which said heads are provided with an amplifier connected in common thereto, and means for transmitting said playback information recordings from all said tracks to said amplifier over a multiplex frequency modulation transmission channel.

22. A system according to claim 17 in which said heads are provided with an amplifier, means connecting said heads through respective superaudible carrier frequency channels to said amplifier, means including a constructional facility such as an electric power line on which said carriers are impressed, a plurality of carrier selectors, and means including said selector means to connect said carrier selectors to said reproducer.

23. In a system for receiving and responding to transmitted information, the combination of a master tape having a plurality of tracks with each track having a series of segments containing distinctive recordings, playback heads one for each track, means to translate the played back information from each track into a distinctive modulated sub-carrier frequency, a radio transmitter, means to modulate said transmitter by said modulated sub-carriers, a radio receiver for receiving said sub-carriers, a sound reproducer, means in said receiver including manually operable selector switch means for selecting a particular sub-carrier and for detecting the original information signal modulations thereof and applying them to said reproducer, certain of said segments containing played back recordings for indicating to a listener a choice of one out of several said switch means for operation, and means including another segment on one of said tracks and the playback head asociated therewith for providing information to said listener confirming whether said choice is correct or incorrect.

24. A system according to claim 23 in which said transmitter is a frequency modulated transmitter and said receiver is a frequency modulation receiver, and a source of other signals also connected to modulate said transmitter over a respective multiplex channel to modulate said transmitter for broadcast transmission and reception independently of said tape.

25. A system according to claim 23 in which said receiver includes another manually operable switch effective in one poistion to connect said reproducer to the detector of said receiver independently of said plurality of manually operable switch means.

26. A system according to claim 23 in which each of said switch means is connected to respective elements for making a permanent record in a recorded web corresponding to the successive operations of said switches.

27. In a machine tutoring system and the like the combination of a master tape having at least one pair of tracks with at least one track having at least one segment containing educational information to be answered "yes" or "no," a plurality of playback heads one for each track, said tracks also having other segments so disposed on said tape that said one segment is first presented to its associated head and at a later time said other segments are simultaneously presented to said heads, means for moving said tape with respect to said heads, a sound reproducer, a plurality of manually operable selector switch means one for each track to connect each head selectively to said reproducer, the first mentioned segment including instructions for operating one out of each plurality of switch means, means for automatically stopping the playback at the end of said first mentioned segment to give a student time to consider his "yes" or "no" answer and to operate a corresponding one of said switches in order to select a correct response to the educational information presented, means responsive to said selected switch means to restart the playback of a succeeding other segment, said succeeding other segment containing information as to the correctness or incorrectness of the student's answer and also instructions for the choice of operation of one of said switch means to receive the statement of a succeeding problem.

28. A system according to claim 27 in which said tape has a plurality of pairs of tracks with the information in each pair duplicated in corresponding segments.

29. A system for teaching a large listening audience by means of broadcasting comprising plural channel information storage means having tutorial information thereon, said tutorial information being divided into problem and answer segments, a frequency modulation transmitter having a plurality of multiplex sub-carrier channels, each of said sub-carrier channels transmitting the tutorial information from a different one of said channels of said storage means, a plurality of receivers, each receiver including means for selectively receiving each of said sub-carrier channels containing the tutorial information, said selective reception means being operable by the listeners at said receivers in response to choices presented during transmission of said problem segment and the selection of one channel constituting an answer to a given problem, and means for confirming to each listener the correctness or incorrectness of his selected response.

30. A system for teaching a large listening audience by means of broadcasting comprising plural channel information storage means, a frequency modulation transmitter having a plurality of multiplex sub-carrier channels, each of said sub-carrier channels transmitting information from a different one of said channels of said storage means, at least one of said storage means having first segments thereon containing information to be responded to by a listener, other segments in certain channels of said storage means containing information of respectively different categories related to the information in said first segments, said first segments and said other segments being so disposed on said information storage means that the information in a first segment is first transmitted over one of said sub-carrier channels and at a later time the information in said other segments related thereto is then simultaneously transmitted over certain of said subcarrier channels, a plurality of receivers, each receiver including means for selectively receiving each of said subcarrier channels containing said information, said selective reception means being operable by the listeners at said receivers and the selection of one channel constituting a response to selected information presented in a given first segment.

31. A method for teaching a large listening audience by means of broadcasting, said method comprising prerecording a teaching sequence on different channels of a plural-channel information-storage means, said teaching sequence including problems to be answered, a plurality of choices to be presented in response to each problem and means for confirming the correctness or incorrectness of said response, transmitting said teaching sequence from said storage means over a plural-channel transmitter wherein a different transmitter channel is provided for each information channel of said storage means, receiving said teaching sequence at locations remote from the transmitter by means of a plural channel receiver at each location, responding to said problems at the different locations by actuating selector means at each receiver provided for selecting one of said plurality of choices, and confirming to each listener the correctness or incorrectness of his selected response.

32. A method for teaching a large listening audience by means of broadcasting a teaching sequence wherein said sequence includes problems to be answered followed by a plurality of choices to be presented for selection by the listeners in response to each problem and means for confirming the correctness or incorrectness of the responses, said method comprising the steps of prerecording said teaching sequence on different channels of a plural-channel information-storage means, feeding the information from each given channel on said information storage means through a different multiplex subcarrier channel of a frequency modulation transmitter, transmitting said sub-carrier channel information, receiving said teaching sequence at locations remote from the transmitter by means of a plural sub-carrier channel multiplex receiver at each location, responding to said problems at the different locations by actuating selector means to receive one of said sub-carrier channels as the listener-selected choice of said plurality of choices available, and confirming to each listener the correctness or incorrectness of the selected response.

References Cited by the Examiner

UNITED STATES PATENTS

| | | | |
|---|---|---|---|
| 1,633,082 | 6/1927 | Espenschied | 307—3 |
| 1,749,226 | 3/1930 | Pressey | 35—9 |
| 2,514,425 | 7/1950 | Thompson | 235—48 |
| 3,141,243 | 7/1964 | Chapman et al. | 35—9 |
| 3,194,895 | 7/1965 | Treadwell | 35—8.1 |

EUGENE R. CAPOZIO, *Primary Examiner.*

R. E. KLEIN, *Assistant Examiner.*